(12) United States Patent
Sornamani (10) Patent No.: US 11,718,281 B2
(45) Date of Patent: Aug. 8, 2023

(54) BRAKE CONTROL SYSTEM

(71) Applicant: FAIVELEY TRANSPORT RAIL TECHNOLOGIES INDIA PRIVATE LIMITED, Tamil Nadu (IN)

(72) Inventor: Krishnakumar Sornamani, Tamil Nadu (IN)

(73) Assignee: FAIVELEY TRANSPORT RAIL TECHNOLOGIES INDIA PRIVATE LIMITED, Tamil Nadu (IN)

( * ) Notice: Subject to any disclaimer, the term of this patent is extended or adjusted under 35 U.S.C. 154(b) by 156 days.

(21) Appl. No.: 17/516,008

(22) Filed: Nov. 1, 2021

(65) Prior Publication Data

US 2022/0185252 A1 Jun. 16, 2022

(30) Foreign Application Priority Data

Dec. 1, 2020 (IN) .............................. 202041052369

(51) Int. Cl.
*B60T 8/94* (2006.01)
*B60T 8/36* (2006.01)
(Continued)

(52) U.S. Cl.
CPC .............. *B60T 8/94* (2013.01); *B60T 8/3605* (2013.01); *B60T 13/365* (2013.01); *B60T 13/683* (2013.01); *B60T 2270/402* (2013.01)

(58) Field of Classification Search
CPC .... B60T 13/365; B60T 13/665; B60T 13/683; B60T 8/3605; B60T 8/94; B60T 17/228;
(Continued)

(56) References Cited

U.S. PATENT DOCUMENTS

| 2007/0205657 | A1* | 9/2007 | Bradley | B60T 8/1705 303/8 |
| 2015/0061359 | A1* | 3/2015 | Grasso | B61H 13/20 303/8 |
| 2018/0215364 | A1* | 8/2018 | Tione | B60T 13/665 |

FOREIGN PATENT DOCUMENTS

| EP | 0958980 A2 | 11/1999 |
| EP | 0958980 A3 | 12/2002 |
(Continued)

OTHER PUBLICATIONS

First Examination Report dated Jun. 30, 2022 for corresponding Indian Patent Application No. 202041052369 (6 pages).
(Continued)

*Primary Examiner* — Robert A. Siconolfi
*Assistant Examiner* — San M Aung
(74) *Attorney, Agent, or Firm* — The Small Patent Law Group LLC; Christopher R. Carroll (57) ABSTRACT

A brake control system includes first and second brake control units for controlling braking of first and second bogies of a rail car. The brake control units include relay valves for controlling pressurized air flow from a main reservoir to brake cylinder pipes. A bypass conduit connects an outlet of a first brake control module to an outlet of a second brake control module. A fail-safe valve moves between open and closed positions. In the closed position, the fail-safe valve prevents a flow of the pressurized air between the brake control units. The fail-safe valve provides a first pilot pressure to a first relay valve upon a failure of the first brake control unit and provides a third pilot pressure to the second relay valve in response to a failure of the second brake control unit.

10 Claims, 6 Drawing Sheets

(51) Int. Cl.
*B60T 13/36* (2006.01)
*B60T 13/68* (2006.01)

(58) Field of Classification Search
CPC ... B60T 2270/402; B60T 8/1705; B60T 8/362
USPC .......................................................... 303/8
See application file for complete search history.

(56) References Cited

FOREIGN PATENT DOCUMENTS

| WO | WO-2015078666 A1 * | 6/2015 | ............ B60T 13/665 |
| WO | 2017017617 A1 | 2/2017 | |
| WO | 2017021837 A1 | 2/2017 | |

OTHER PUBLICATIONS

First Examination Report dated Feb. 7, 2023 for corresponding Australian Patent Application No. 2021266326 (3 pages).
Extended European Search Report dated May 12, 2022 for corresponding European Patent Application No. 21 211 541.4 (5 pages).

* cited by examiner

BRAKE CONTROL SYSTEM

CROSS-REFERENCE TO RELATED APPLICATIONS

This application claims priority to Indian Patent Application No. IN202041052369 (filed 1 Dec. 2020), the entire disclosure of which is incorporated herein by reference.

BACKGROUND

Technical Field

The present disclosure generally relates to a brake control system for a rail vehicle. More Specifically, the disclosure relates to a brake control system and a method for controlling a braking of a rail car during a hardware or electric or electronic control failure.

State of Art

For over the last century, trains have employed pneumatic braking systems to control the movement of railcars, metro railcars and locomotives. In case of locomotive with railcars, railcar brake application or release is typically configured to respond to changes in brake pipe pressure, the brake pipe being a long continuous pipe that runs from the lead locomotive to the last railcar. When the brakes of the train are to be applied, electrically actuated control valves reduce the brake pipe pressure, and the individual brakes at each railcar are applied in response. When the brakes of the train are to be released, electric control valves modulate brake pipe pressure, and the individual brakes at each railcar are released in response. The electric control valves for controlling the pressure of the brake pipe may be housed in a control unit in the locomotive, which may receive electronic control input from a locomotive driver brake Controller. In case of metro railcars with single pipe system, brake application and release are directly controlled by electrically actuated control valves with pneumatic relays by filling and venting brake cylinders on each bogie. In case of metro railcars with double pipe system, along with system described above for single pipe system, there is a brake pipe that runs from first rail car to last rail car similar to locomotive with railcars to apply and release brakes in each car during failure of electrically actuated control valves.

If the control valves fail, brake pipe pressure/brake cylinder pressure will not be in a position to be reduced or modulated. However, the train may still be brought to a stop through emergency brake application. Typically, emergency brake valves are used to rapidly reduce air pressure in the brake pipe/fill pressure in brake cylinder pipe to trigger application of the train's brakes. However, failure of the electronic controls prevents normal operation of the train and may prevent the train from effectively continuing the journey until it can be serviced and repaired. Furthermore, current systems may not allow a train operator to continue operating the locomotive/metro railcars under the default brake application and release functions. There is a need in the art for a system that allows a train to operate with the default brake functionality, even after failure of one or more control valves.

BRIEF SUMMARY

According to an aspect of the disclosure, a brake control system for a railcar having two bogies is disclosed. The brake control system includes a first brake control unit for controlling a braking of a first bogie of the rail car. The first brake control unit includes a first relay valve for controlling a flow of pressurized air from a main reservoir to a first brake cylinder pipe to control the braking of the first bogie. The first relay valve allows the flow of pressurized air to the first brake cylinder pipe on application of a first pilot pressure to the first relay valve. The first brake control unit further includes a first brake control module for controlling an application of the first pilot pressure to the first relay valve to actuate the first relay valve. The first brake control module controls the application of the first pilot pressure during a normal working of the first brake control unit. The brake control system further includes a second brake control unit for controlling a braking of a second bogie of the rail car. The second brake control unit includes a second relay valve to control a flow of pressurized air from the main reservoir to a second brake cylinder pipe for controlling the braking of the second bogie. The second relay valve allows the flow of pressurized air to the second brake cylinder pipe on application of a third pilot pressure to the second relay valve. The second brake control unit also includes a second brake control module for controlling an application of the third pilot pressure to the second relay valve during a normal working of the second brake control unit. The brake control system further includes a bypass conduit and a fail-safe valve. The bypass conduit connects an outlet of the first brake control module to an outlet of the second brake control module. Moreover, the fail-safe valve is adapted to move between an open position and a close second position. In the close position, the fail-safe valve prevents a flow of the pressurized air between the first brake control unit and the second brake control unit via the bypass conduit. In the open position, the fail-safe valve allows a flow of the pressurized air between the first brake control unit and the second brake control unit via the bypass conduit. The fail-safe valve provides the first pilot pressure to the first relay valve upon a failure of the first brake control unit and provides the third pilot pressure to the second relay valve in response to a failure of the second brake control unit.

In one embodiment, the first brake control module includes a first application valve fluidly connected to the main reservoir and adapted to move to an open position and a close position. The first application valve is moved to the open position upon receipt of an electrical signal in response to an actuation of the braking of the rail car to allow the flow of pressurized air from the main reservoir to the first relay valve. The first brake control module also includes a first isolation valve disposed downstream of the first application valve and adapted to control a flow of the pressurized air to the first relay valve from the first application valve. The first isolation valve is moved to a close position upon detection of the failure of the first brake control unit to prevent a flow of pressurized air between the first application valve and the first relay valve.

In one embodiment, the first brake control module includes a first release valve fluidly connected to the first application valve and the first isolation valve. The first release valve facilitates in releasing the first pilot pressure being applied to the first relay valve to release braking of the first bogie.

According to one embodiment, the first release valve is moved to the close position upon detection of the application of the brakes of the rail car. In the close position, the first release valve prevents a flow of the pressurized air to a downstream of the first release valve.

In an embodiment, the second brake control module includes a second application valve fluidly connected to the main reservoir and adapted to move to an open position and a close position. The second application valve is moved to the open position upon receipt of an electrical signal in response to actuation of the braking of the rail car to allow flow of pressurized air from the main reservoir to the second relay valve. The second brake module further includes a second isolation valve disposed downstream of the second application valve and adapted to control a flow of the pressurized air to the second relay valve from the second application valve. The second isolation valve is moved to a close position upon detection of the failure of the second brake control unit to prevent a flow of pressurized air between the second application valve and second relay valve.

According to one embodiment, the second brake control module includes a second release valve fluidly connected to the second application valve and the second isolation valve. The second release valve facilitates in releasing the third pilot pressure being applied to the second relay valve to release braking of the second bogie.

In one embodiment, the second release valve is moved to the close position upon detection of the application of the brakes of the rail car. In the close position, the second release valve prevents a flow of the pressurized air to a downstream of the second release valve.

In an embodiment, the failure of the first brake control unit is detected upon detecting a failure of at least one of the first application valve or the first release valve.

In one embodiment, the failure of the second brake control unit is detected upon detecting a failure of at least one of the second application valve or the second release valve.

According to one embodiment, the brake control system includes a second fail-safe valve fluidly connecting the brake control system to another brake control system of another rail car for providing pilot pressures to another brake control system.

BRIEF DESCRIPTION OF THE DRAWINGS

In the following, the invention will be described in greater detail with reference to embodiments shown by the enclosed figures. It should be emphasized that the embodiments shown are used for example purposes only and should not be used to limit the scope of the invention.

DETAILED DESCRIPTION

Figure 1:
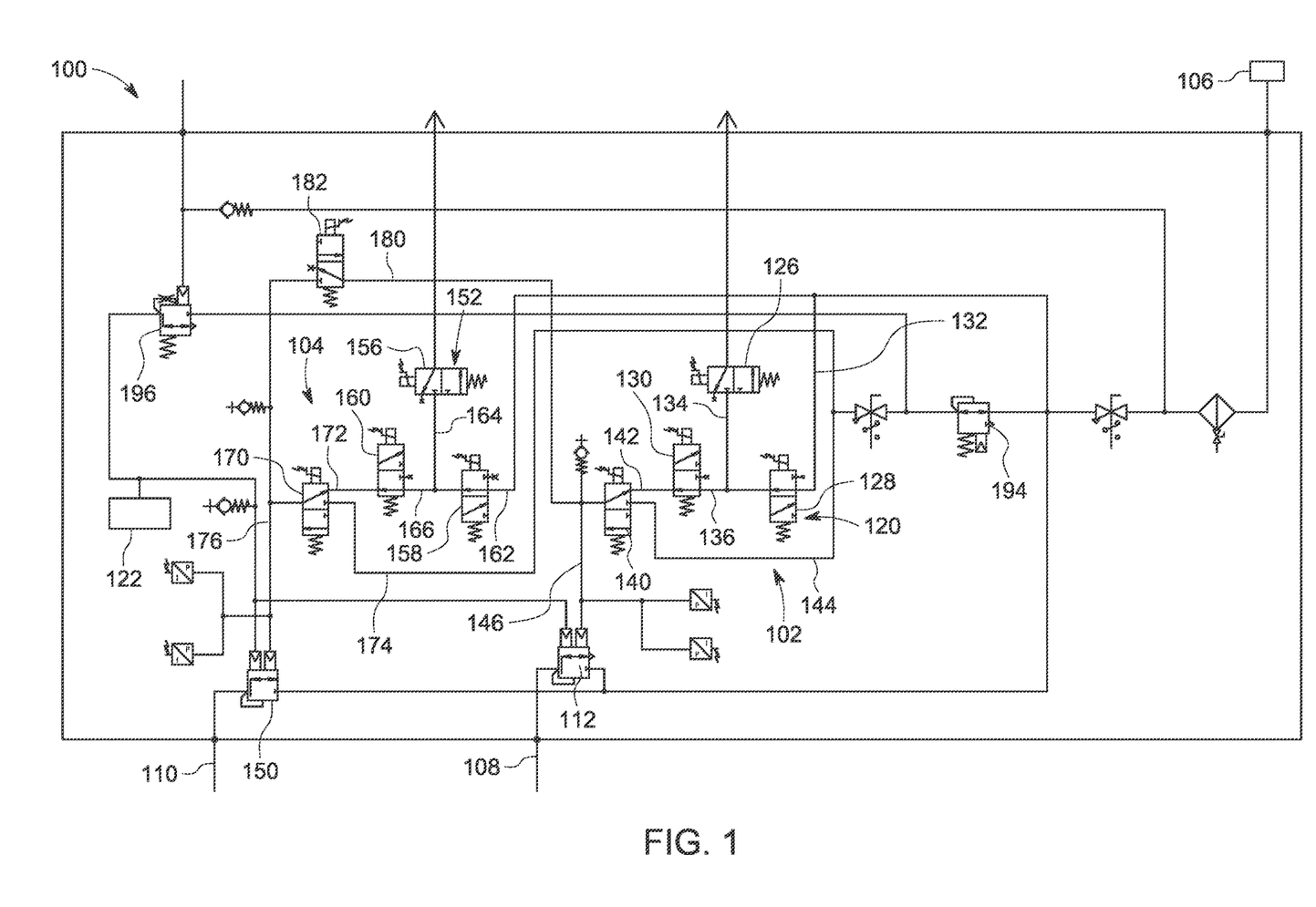
FIG. 1 illustrates a brake control system having a first brake control unit for controlling a braking of a first bogie of a rail car and a second brake control unit for controlling a braking of a second bogie of the rail car, in accordance with an embodiment of the disclosure.
Figure 2:
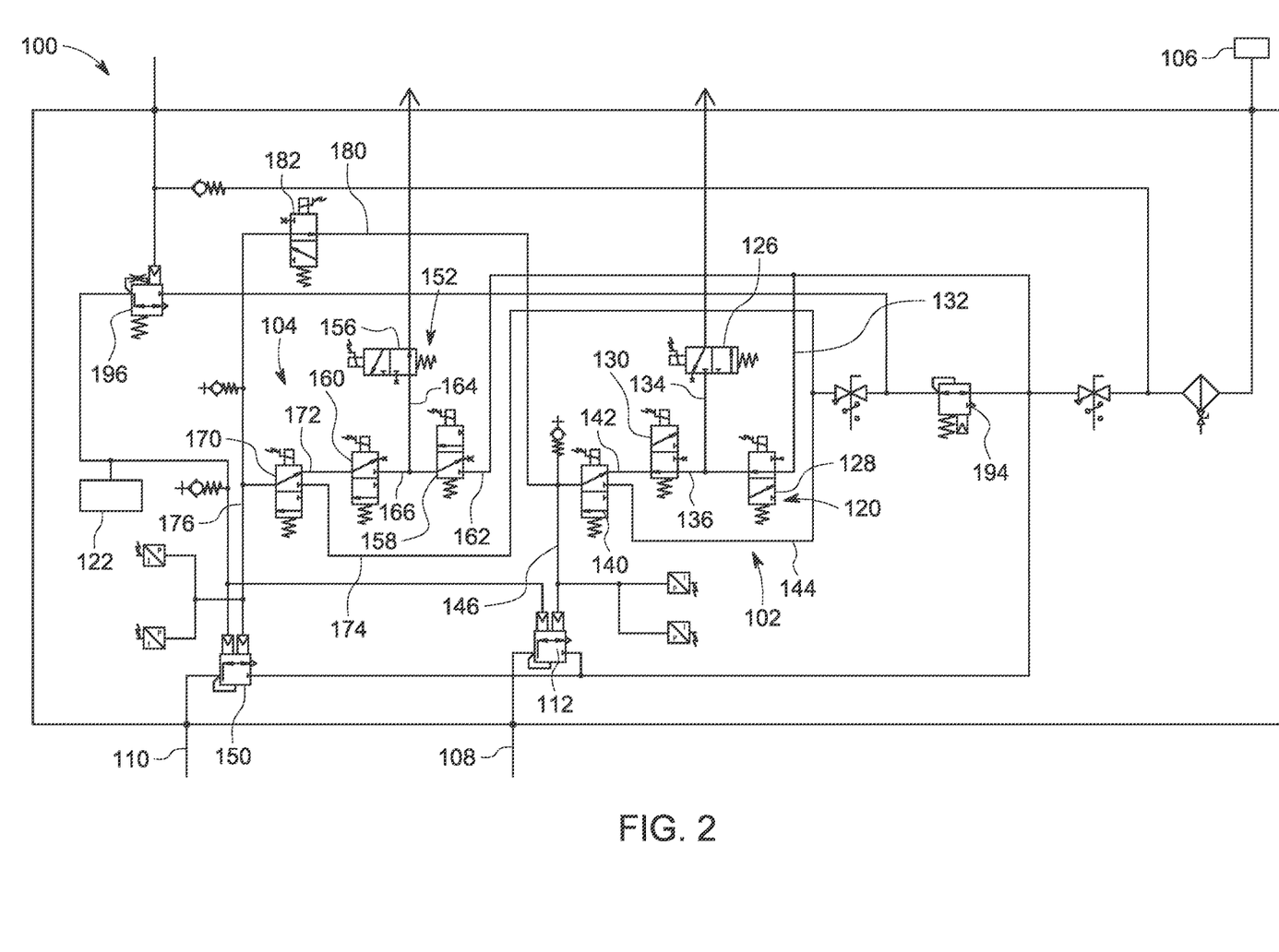
FIG. 2 illustrates the brake control system depicting a first fail-safe valve in an open position to provide the pilot pressure to the second brake control unit from the first brake control unit during a failure of the second brake control unit, in accordance with an embodiment of the disclosure.
Figure 3:
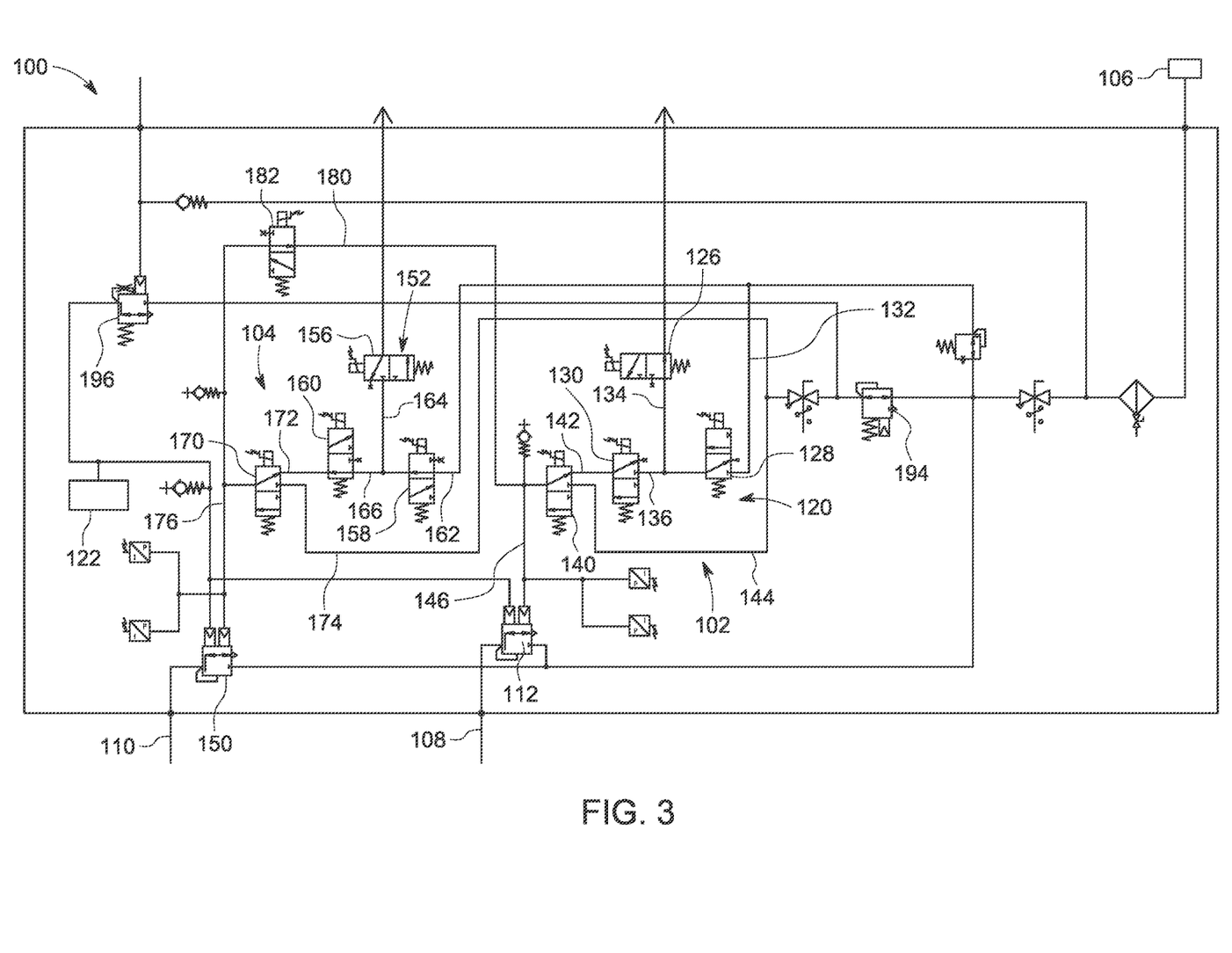
FIG. 3 illustrates the brake control system depicting the first fail-safe valve in the open position to provide the pilot pressure to the first brake control unit from the second brake control unit during a failure of the first brake control unit, in accordance with an embodiment of the disclosure.

Referring to FIGS. 1, 2, and 3, a schematic view of a brake control system 100 for controlling an application and release of brakes of a rail car is shown. Typically, each rail car includes two bogies and the brake control system 100 includes a first brake control unit 102 for controlling an application and release of a first brake associated with one of the bogies and a second brake control unit 104 for controlling a second brake associated with other of the bogies. Each of the brake control units 102, 104 is adapted to control a flow of pressurized air from a main reservoir 106 to a corresponding one of two brake cylinder pipes 108, 110 and controlling air pressure in the brake cylinder pipes 108, 110 for controlling an application and/or release of the brakes (not shown) of the two bogies.

As shown, the first brake control unit 102 includes a first relay valve 112 in fluid communication with the main reservoir 106 and a first brake cylinder pipe 108 and adapted to control a flow of pressurized air from the main reservoir 106 to the first brake cylinder pipe 108, and a first brake control module 120 to control an application of a pilot pressure (first pilot pressure) applied to the first relay valve 112. Further, the brake control system 100 includes a control reservoir 122 fluidly connected to the main reservoir 106 and adapted to control a pressure value of a second pilot pressure applied to the first relay valve 112. The opening and closing of the first relay valve are controlled by controlling the first pilot pressure and the second pilot pressure provided to the first relay valve 112.

The first relay valve 112 may be a pneumatically operated/actuated valve and prevents or allow a flow pressurized air from the main reservoir 106 to the first brake cylinder pipe 108. The first relay valve 112 is adapted to move to an open position and a close position based on the first pilot pressure and the second pilot pressure applied to the first relay valve 112. In an embodiment, in the open position, the first relay valve 112 allows a flow of pressurized air from the main reservoir 106 to the first brake cylinder pipe 108 and/or vents the pressurized air from first brake cylinder pipe 108 according to the first pilot pressure and the second pilot pressure, while in the close position, the first relay valve 112 prevents the flow of pressurized air from the main reservoir 106 to the first brake cylinder pipe 108.

To control the first pilot pressure being applied to the first relay valve 112, and hence the application or release of the brakes of the first bogie, the first brake control unit 102 includes a first brake control module 120 having a first release valve 126, a first application valve 128, and a first isolation valve 130. The valves 126, 128, 130 are electrically actuated valves and move to energised states upon receipt of electrically signals.

As shown, the first application valve 128 is fluidly connected to the main reservoir 106 and is adapted to move between an open position (energized state) (shown in FIGS. 1 and 2) and a close position (de-energised state) (shown in FIG. 3). As shown, the first application valve 128 is fluidly connected to the main reservoir 106 via a first flow line 132. Further, the first application valve 128 is fluidly coupled to the first release valve 126 via a second flow line 134 and is fluidly coupled to the first isolation valve 130 via a third flow line 136. Accordingly, the first release valve 126 is fluidly connected to both the first isolation valve 130 and the first application valve 128. As shown, both the first release valve 126 and the first isolation valve 130 are disposed downstream of the first application valve. In the open position, the first application valve 128 allows a flow of the pressurized air from the main reservoir 106 to the first isolation valve 130 via the third flow line 136. It may be appreciated that the first application valve 128 is biased to the close position and moves to the open position upon receipt of an electric actuation signal.

Similar to the first application valve 128, the first release valve 126 is adapted to move between an open position (deenergised state) (shown in FIG. 3') and a close position (energised state) (shown in FIG. 1 and FIG. 2), and is biased to the open position. Therefore, the first release valve 126 moves to the close position upon receipt of an electric actuation signal. In the open position, the first release valve 126 allows the flow of the pressurized air downstream of the first release valve 126, while, in the close position, the first release valve 126 prevents the flow of pressurized air downstream of the first release valve 126.

Further, the first isolation valve 130 is also adapted to move between an open position (deenergised state) and a close position (energised state), and is biased to the open position. Therefore, the first isolation valve 130 moves to the close position upon receipt of an electric actuation signal. In the open position, the first isolation valve 130 allows the flow of the pressurized air to the first relay valve 112, while, in the close position, the first isolation valve 130 prevents the flow of pressurized air to the first relay valve from the first application valve 128 and vice versa. Accordingly, in the close position, the first isolation valve 130 isolates the first brake control module 120 from the first relay valve 112 and the second brake control unit 104.

Further, the first brake control unit 102 may include a first emergency valve 140 fluidly coupled to the first isolation valve 130 via a fourth flow line 142, and is disposed downstream of the first isolation valve 130. The first emergency valve 140 is also fluidly coupled to the main reservoir 106 to receive the pressurized air from the main reservoir 106 via a fifth flow line 144. Further, the first emergency valve 140 is fluidly connected to the first relay valve 112 via a sixth flow line 146. As shown, the first emergency valve 140 is an electrically actuated valve and adapted to move between a first position and a second position. The first emergency valve 140 is biased to the first position and moves to the second position upon receipt of an electric actuation signal. In the first position, the first emergency valve 140 fluidly connects the fifth flow line 144 to the sixth flow line 146 to allow the flow of pressurized air as the first pilot pressure from the main reservoir 106 to the first relay valve 112 via the fifth flow line, while in the second position, the first emergency valve 140 fluidly connects the fourth flow line 142 to the first relay valve 112 via the sixth flow line 146 to apply the first pilot pressure to the first relay valve 112.

It may be appreciated that during a normal working of the first brake control unit 102, a first controller of the first brake control 102 unit may apply/provide electric actuation signal to the valves 126, 128, 140 in response to a detection of depression/movement of the brake lever by an operator for applying/releasing the brakes to the rail car. For example, the first controller may provide the electric actuation signal to the first application valve 128 and the first release valve 126 to apply the brakes in response to a detection of depression/movement of the brake lever by an operator for applying the brakes to rail car when the brake control system 100 or the first brake control unit 102 is working normally. Also, the first emergency valve 140 is provided the electrical actuation to keep the first emergency valve 140 at the second position irrespective of the movement of the brake lever. Accordingly, to apply the brakes, during normal working of the brake control system 100 or the first brake control unit 102, the first controller moves the first application valve 128 to the open position and moves the first release valve 126 to the close position. To release the brakes in response to a detection of depression/movement of the brake lever by an operator for releasing the brakes to rail car, during normal working of the brake control system 100 or the first brake control unit 102, the first controller moves the first application valve 128 to the close position and moves the first release valve 126 to the open position. Also, the first emergency valve 140 is provided the electrical actuation to keep the first emergency valve 140 at the second position irrespective of the movement of the brake lever.

In an embodiment, the brake control system 100 may include a redundant controller to control the actuation of the first isolation valve 130 when there is a failure of the first brake control unit 102 or the brake control system 100. The failure of the first brake control unit 102 is detected when upon detection of the electric failure of the first release valve 126 and/or the first application valve 128. Upon detection of the failure of the first brake control unit 102, the redundant controller may apply/provide electric actuation signals to the first isolation valve 130. Accordingly, the first isolation valve is moved to the close position is response to the detection of the failure of the brake control system 100 or the first brake control unit 102. Therefore, during the normal working of the first brake control unit 102, the first isolation valve 130 remains in the open position and is actuated to the close position upon detection of the failure of first brake control unit 102 or the brake control system 100. Although, the redundant controller is contemplated to control the first isolation valve 130 during the failure of the first brake control unit 102, it may be appreciated that the first controller may also control the first isolation valve 130 upon detection of the failure of the first brake control unit 102.

Referring back to FIG. 1, the second brake control unit 104 includes a second relay valve 150 in fluid communication with the main reservoir 106 and a second brake cylinder pipe 110 and is adapted to control a flow of pressurized air from the main reservoir 106 to the second brake cylinder pipe 110, and a second brake control module 152 to control an application of a pilot pressure (i.e. third pilot pressure) being applied to the second relay valve 150. Further, the control reservoir 122 is fluidly connected to the second relay valve 150, and adapted to control a pressure value of a fourth pilot pressure being applied to the second relay valve 150. The opening and closing of the second relay valve 150 are controlled by controlling the third pilot pressure and the fourth pilot pressure provided to the second relay valve 150.

The second relay valve 150 may be a pneumatically operated valve and prevents or allows a flow pressurized air from the main reservoir 106 to the second brake cylinder pipe 110. The second relay valve 150 is adapted to move to an open position and a close position based on the third pilot pressure and the fourth pilot pressure applied to the second relay valve 150. In an embodiment, in the open position, the second relay valve 150 allows a flow of pressurized air from the main reservoir 106 to the second brake cylinder pipe 110 and/or vents the pressurized air from second brake cylinder pipe 110 according to the third pilot pressure and the fourth pilot pressure, while in the close position, the second relay valve 150 prevents the flow of pressurized air from the main reservoir 106 to the second brake cylinder pipe 110.

To control the third pilot pressure being applied to the second relay valve 150, and hence the application or release of the brakes of the second bogie, the second brake control unit 104 includes a second brake control module 152 having a second release valve 156, a second application valve 158, and a second isolation valve 160. The valves 156, 158, 160 are electrically actuated valves and move to energised states upon receipt of electrical signals.

As shown, the second application valve 158 is fluidly connected to the main reservoir 106 and is adapted to move between an open position (energized state) (shown in FIGS. 1 and 3) and a close position (de-energised state) (shown in FIG. 2). As shown, the second application valve 158 is fluidly connected to the main reservoir 106 via a first flow pipe 162. Further, the second application valve 158 is fluidly coupled to the second release valve 156 via a second flow pipe 164 and is fluidly coupled to the second isolation valve 160 via a third flow pipe 166. In the open position, the second application valve 158 allows a flow of the pressurized air from the main reservoir 106 to the downstream of the second application valve 158 to the second isolation valve 160. It may be appreciated that the second application valve 158 is biased to the close position and moves to the open position upon receipt of an electric actuation signal.

Similar to the second application valve 158, the second release valve 156 is adapted to move between an open position (deenergised state) and a close position (energised state), and is biased to the open position. Therefore, the second release valve 156 moves to the close position upon receipt of an electric actuation signal. In the open position, the second release valve 156 allows the flow of the pressurized air downstream of the second release valve 156 from the second flow pipe 164, while, in the close position, the second release valve 156 prevents the flow of pressurized air downstream of the second release valve 156 from the second flow pipe 164.

Further, the second isolation valve 160 is also adapted to move between an open position (deenergised state) and a close position (energised state), and is biased to the open position. Therefore, the second isolation valve 160 moves to the close position upon receipt of an electric actuation signal. In the open position, the second isolation valve 160 allows the flow of the pressurized air to the second relay valve 150, while in the close position, the second isolation valve 160 prevents the flow of pressurized air to the second relay valve 150 from the third flow pipe 166 and vice versa. Accordingly, in the close position, the second isolation valve 160 isolates the second brake control module 152 from the second relay valve 150 and the first brake control unit 102.

Further, the second brake control unit 104 may include a second emergency valve 170 fluidly coupled to the second isolation valve 160 via a fourth flow pipe 172 and is situated downstream of the second isolation valve 160. The second emergency valve 170 is also fluidly coupled to the main reservoir 106 to receive the pressurized air from the main reservoir 106 via a fifth flow pipe 174. Also, the second emergency valve 170 is fluidly connected to the second relay valve 150 via a sixth flow pipe 176. As shown, the second emergency valve 170 is an electrically actuated valve and adapted to move between a first position and a second position. The second emergency valve 170 is biased to the first position and moves to the second position upon receipt of an electric actuation signal. In the first position, the second emergency valve 170 fluidly connects the fifth flow pipe 174 to the sixth flow pipe 176, and hence the second relay valve 150, to allow the flow of pressurized air (i.e. the third pilot pressure) from the main reservoir 106 to the second relay valve 150, while in the second position, the second emergency valve 170 fluidly connects the fourth flow pipe 172 to the sixth flow pipe 176 to allow flow of pressurized air (i.e. the third pilot pressure) from the second brake control module 152 to the second relay valve 150.

It may be appreciated that during a normal working of the second brake control unit 104, a second controller of the second brake control unit 104 may apply/provide electric actuation signal to the valves in response to a detection of depression/movement of the brake lever by an operator for applying/releasing the brakes to the second bogie (i.e. the rail car). For example, the second controller may provide the electric actuation signal to the second application valve 158 and the second release valve 156 to apply the brakes in response to a detection of depression/movement of the brake lever by an operator for applying the brakes to the rail car when the second brake control unit 104 is working normally. Accordingly, to apply the brakes, during normal working of the second brake control unit 104, the second controller moves the second application valve 158 to the open position and moves the second release valve 156 to the close position. Also, it may be appreciated the second emergency valve 170 remains in the second position during the normal working of the second brake control unit 104. To release the brakes in response to a detection of depression/movement of the brake lever by an operator for releasing the brakes to rail car, during normal working of the second brake control unit 104, the second controller moves the second application valve 158 to the close position and moves the second release valve 156 to the open position. Also, it may be appreciated the second emergency valve 170 remains in the second position during the normal working of the second brake control unit 104.

In an embodiment, the redundant controller controls the second isolation valve 160 when there is a failure of the second brake control unit 104 or the brake control system 100. The failure of the second brake control unit 104 is detected when upon detection of the electric failure of the second release valve 156 and/or the second application valve 158. During the failure mode, the redundant controller may apply/provide electric actuation signals to the second isolation valve 160. Accordingly, the second isolation valve 160 is moved to the close position is response to the detection of the failure of the brake control system 100 or the second brake control unit 104. Therefore, during the normal working of the second brake control unit 104, the second isolation valve 160 remains in the open position and is actuated to the close position upon detection of the failure of the second brake control unit 104 or the brake control system 100. Although, the redundant controller is contemplated to control the second isolation valve 160 during the failure of the second brake control unit 104, it may be appreciated that the first controller may also control the second isolation valve 160 upon detection of the failure of the second brake control unit 104.

Also, the brake control system 100 includes a bypass conduit 180 fluidly connecting the sixth flow line 146 to sixth flow pipe 176 to allow flow of pressurized air therebetween. To control the flow of pressurized air between the sixth flow line 146 and the sixth flow pipe 176, and hence, between the first brake control unit 102 and the second brake control unit 104, the brake control system 100 includes a fail-safe valve 182. As shown, the fail-safe valve 182 is an electromechanical valve and adapted to move between an open position and a close position. In the open position, the fail-safe valve 182 allows a flow of pressurized air between the first brake control unit 102 and the second control unit 104, while in the close position, the fail-safe valve 182 prevents the flow of pressurized air between the first brake control unit 102 and the second brake control unit 104. Also, the fail-safe valve 182 is biased to the close position, and moves to the open position upon receipt of an electric actuation signal. Moreover, the fail-safe valve 182 remains in the close position when the brake control system 100 is working normally (i.e. there is no failure of first brake control unit 102 and/or the second brake control unit 104). The fail-safe valve 182 is moved to the open position upon detection of the failure of the first brake control unit 102 and/or the second brake control unit 104. The fail-safe valve 182 allows a flow the pressurized air (i.e. third pilot pressure) to the second relay valve 150 from downstream of the first brake control module 120 via the bypass conduit 180 when there is a failure of the second brake control unit 104 and the first brake control unit is working normally. Also, The fail-safe valve 182 allows a flow the pressurized air (i.e. first pilot pressure) to the first relay valve 112 from downstream of the second brake control module 152 via the bypass conduit 180 when there is a failure of the first brake control unit 102, while the second brake control unit 104 is working normally.

Figure 4:
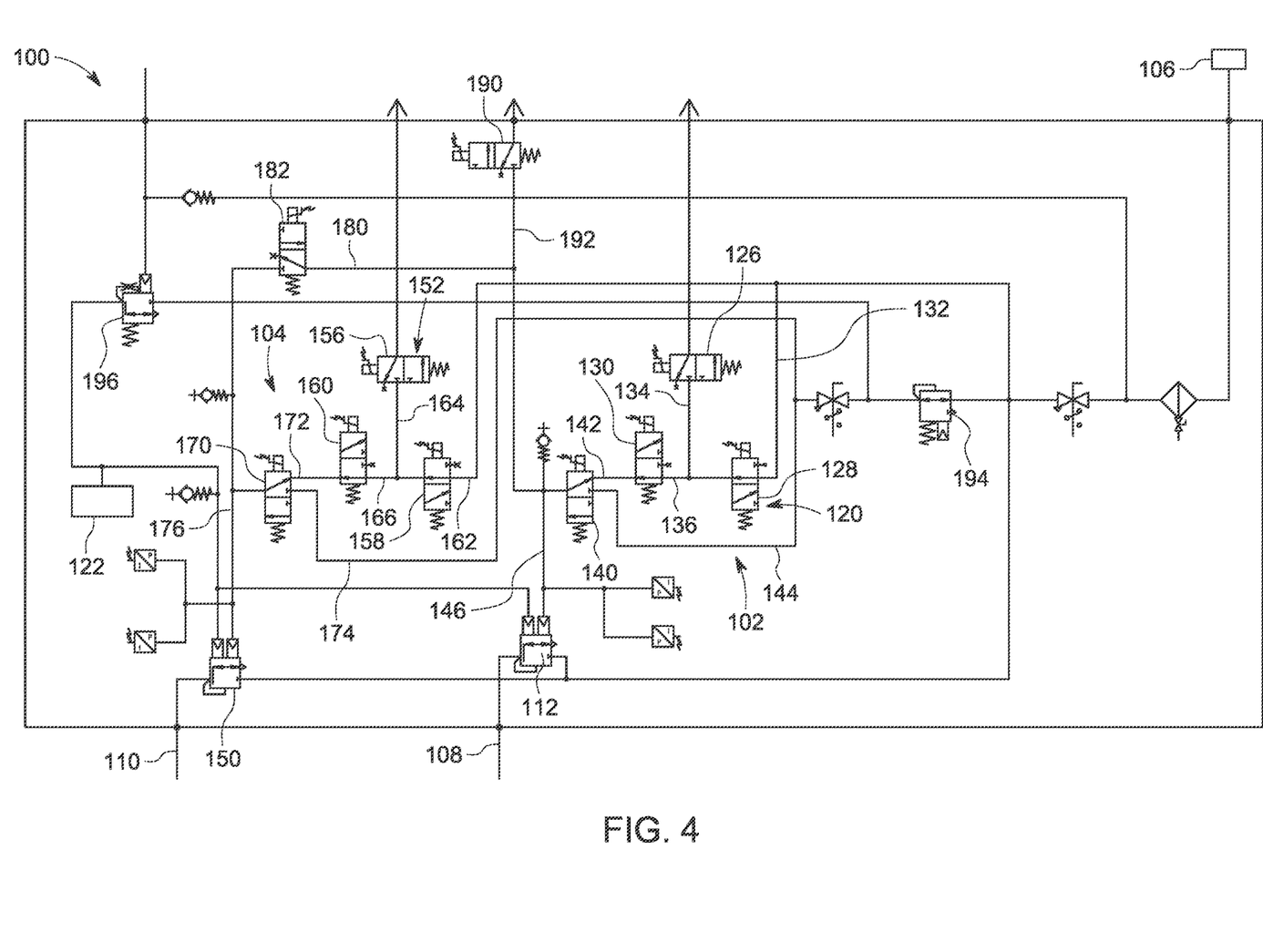
FIG. 4 illustrates the brake control system having a second fail-safe valve to provide pressurized air to a brake control system of another rail car, in accordance with an embodiment of the disclosure.
Figure 5:
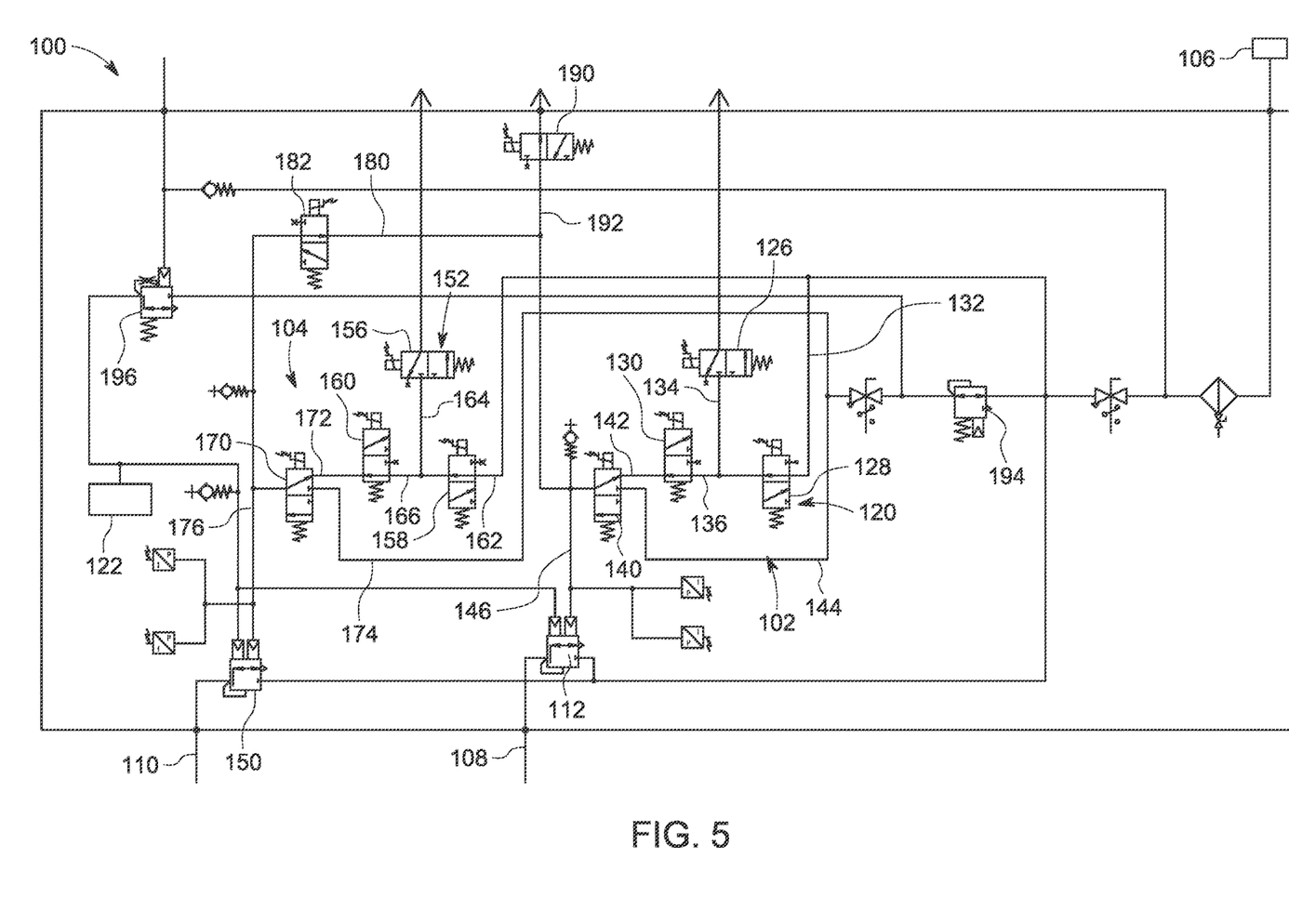
FIG. 5 illustrates the brake control system depicting second fail-safe valve in an open position providing pressurized air to a brake control system of another rail car, in accordance with an embodiment of the disclosure.

Referring to FIG. 4 and FIG. 5, the brake control system 100 includes a second fail-safe valve 190 to provide the pressurized air to the relay valves of a second rail car in case a failure of brake control system of the second rail car is detected. Also, the second fail-safe valve 190 facilitates in receiving the pressurized air from the second rail car in case of failure of both the brake control units 102, 104. The second fail-safe valve 190 is connected to the bypass conduit 180 via a flow conduit 192. As shown, the second fail-safe valve 190 is an electromechanical valve and adapted to move between an open position and a close position. In the open position, the second fail-safe valve 190 allows flow of pressurized air from brake control system 100 of the rail car to the brake control system of the second rail car and vice-versa, while in the close position, the second fail-safe valve 190 prevents the flow of pressurized air between the two brake control systems. Also, the second fail-safe valve 190 is biased to the close position, and moves to the open position upon receipt of an electric actuation signal.

Also, the brake control system 100 may include a first pressure regulator 194 to control/modulate a pressure of the pressurized air supplied to the first emergency valve 140 via the fifth flow line 144 and the second emergency valve 170 via the fifth flow pipe 174. Additionally, the brake control system 100 may include a second pressure regulator 196 to control/module a pressure of the pressurized air being supplied to the control reservoir 122, and hence values of the second and fourth pilot pressures.

Figure 6:
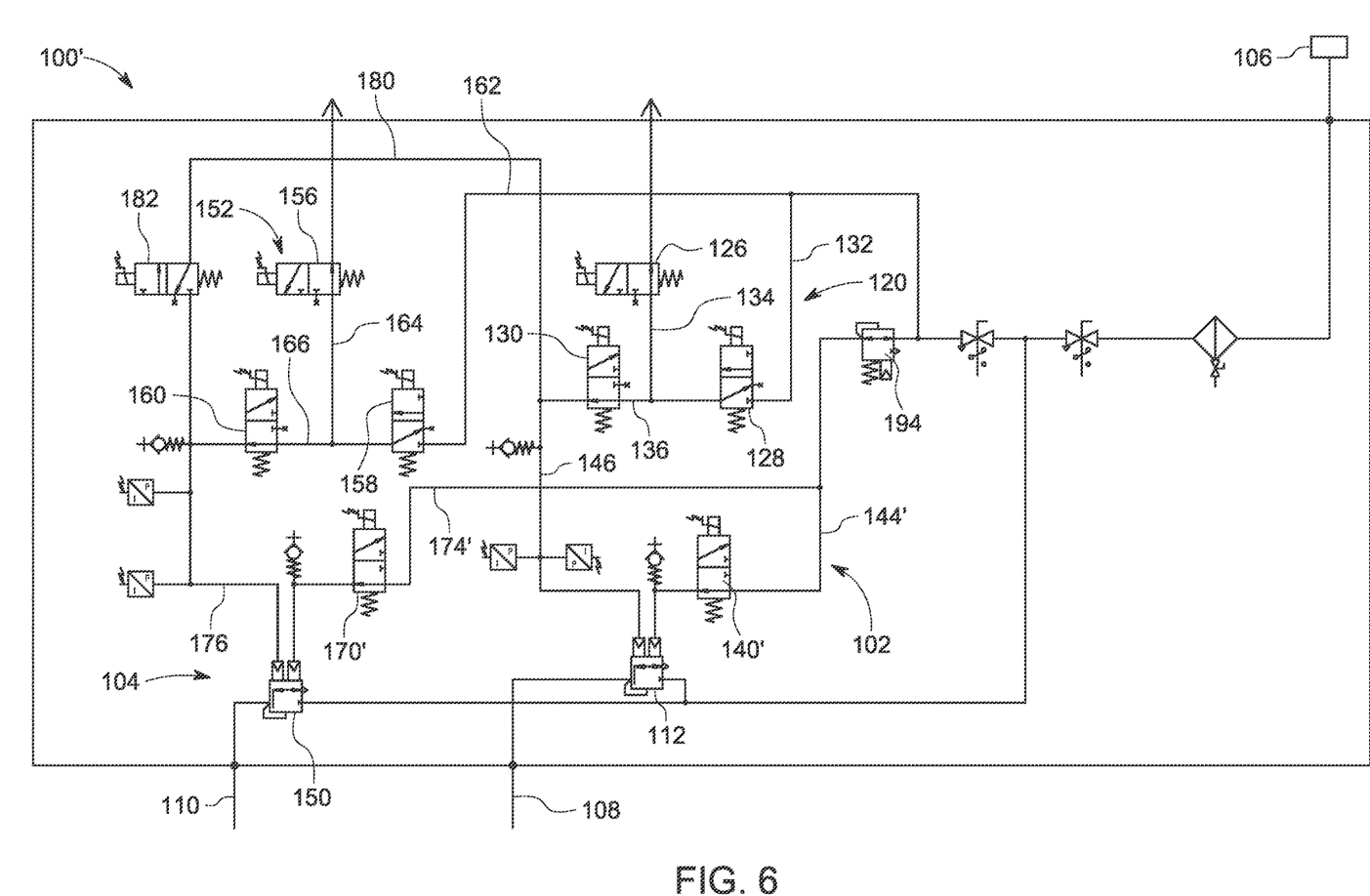
FIG. 6 illustrates a brake control system, in accordance with an alternative embodiment of the disclosure.

Referring to FIG. 6, a brake control system 100' is shown according to an alternative embodiment of the disclosure. The brake control system 100' is similar to the brake control system 100 except that the control reservoir 122 is omitted from the brake control system 100'. Also, in the brake control system 100', a first emergency valve 140' is connected to a fifth flow line 144' and controls an application of the second pilot pressure to the first relay valve 112 instead of allowing the flow of pressurized air to the first relay valve 112 as the first pilot pressure. Similarly, the second emergency valve 170' is connected to the fifth flow pipe 174' and controls an application of the fourth pilot pressure to the second relay valve 150 instead of allowing the flow of pressurized air to the second relay valve 150 as the third pilot pressure.

An operation of the brake control system 100 is now explained. A functioning of the brake control system 100 during a normal working of the brake control system 100 i.e. when both the first brake control unit 102 and the second brake control unit 104 is working normally is described with reference to FIG. To apply brakes, the operator may operate the brake lever to a brake position. Upon detecting the brake lever in the brake position, the brake controllers (first and second controllers) may control/actuate the first application valve 128 and the second application valve 158 and moves the first application valve 128 and the second application valve 158 to the open position. Further, the brake controllers may actuate the first release valve 126 and the second release valve 156 to the close position. Also, the brake controllers may prevent the actuation of the first isolation valve 130, the second isolation valve 160, and the fail-safe valve 182. Accordingly, the first isolation valve 130 and the second isolation valve 160 remain in the open position, while the fail-safe valve remains in the close position.

In this manner, the first brake control module 120 allows a flow of pressurized air (i.e. the first pilot pressure) from the main reservoir 106 to the first relay valve 112 via the first flow line 132, the first emergency valve 140, while the second brake control module 152 allows a flow of pressurized air (i.e. the third pilot pressure) from the main reservoir 106 to the second relay valve 150 via the first flow pipe 162 via the second emergency valve 170 and the sixth flow pipe 176. Accordingly, the first relay valve 112 is energised/actuated to move to the open position to allow the flow of pressurized air to the first brake cylinder pipe 108 to cause an application of the brakes of the first bogie and second relay valve 150 is actuated to the open position to allow the flow pressurized air to the second brake cylinder pipe 110 to cause an application of the brakes of the second bogie.

A functioning of the brake control system 100 during a failure mode for applying/releasing the brakes to the rail car is now described. The brake controllers may detect the failure mode when a hardware or electric or electronic failure of the first brake control unit 102 and/or the second control unit 104 is detected. With reference to FIG. 3, the functioning of the brake control system 100 during the failure of the first brake control unit 102 and the normal working of the second brake control unit 104 is shown. The failure of first brake control unit 102 is detected/ascertained when an electric failure of the first application valve 128 and/or an electric failure of the first release valve 126 has occurred or the first application valve 128 and/or the first release valve 126 are not energized even after receipt of the electric actuation signals or the first application valve 128 and/or the first release valve 126 are stuck in energized state. Due to the failure of the first application valve 128 and the first release valve 126, the first application valve 128 moves to the close position and the first release valve 126 moves to the open position or the first application valve 128 moves to the close position and the first release valve 126 remains stuck in the closed position. Further, upon detection of the failure of the first application valve 128 and the first release valve 126, the redundant controller or the first controller actuates the first isolation valve 130 to move the first isolation valve 130 to the close position. Accordingly, the first brake control module 120 is isolated from the first relay valve 112 (i.e. the sixth flow line 146). Further, the redundant controller keeps the first emergency valve 140 to the second position.

Also, as the second brake control unit 104 continues to work normally, for brake application, the second controller moves the second application valve 158 to the open position and moves the second release valve 156 to the close position, while keeping the second isolation valve 160 unactuated, thereby the controller keeps the second isolation valve 160 in the open position. Accordingly, the second brake control module 152 allows a flow of the pressurized air to the sixth flow pipe 176 from the main reservoir 106 via the fourth flow pipe 172, and hence to the second relay valve 150 as the third pilot pressure.

Further, upon detection of the failure of the first brake control unit 102, the brake controllers actuate the first fail-safe valve 182 to the open position. In so doing, a flow of the pressurized air from the sixth flow pipe 176 to the sixth flow line 146 via the bypass conduit 180 is enabled. Accordingly, the first pilot pressure is applied to the first relay valve 112 to actuate the first relay valve 112 to the open position to allow the flow of pressurized air from the main reservoir 106 to the first brake cylinder pipe 108 to apply brakes of the first bogie.

For brake release, the second brake control unit 104 moves the second application valve 158 to the close position and moves the second release valve 156 to the open position, while keeping the second isolation valve 160 unactuated, thereby the controller keeps the second isolation valve 160 in the open position. Accordingly, the second brake control module 152 vents the pressurized air from the sixth flow pipe 176 via the fourth flow pipe 172, and hence from the second relay valve 150 as the third pilot pressure. Venting off the third pilot pressure from the second relay valve 150 causes the exhaust of the pressurized air from the second brake cylinder pipe 110 to release brakes of the second bogie.

Further, upon detection of the failure of the first brake control unit 102, the brake controllers actuate the first fail-safe valve 182 to the open position. In so doing, the pressurized air is vented from the sixth flow line 146 via the bypass conduit 180 and the fourth flow pipe 172. Accordingly, the first pilot pressure is vented from the first relay valve 112 that causes the exhaust of pressurized air from the first brake cylinder pipe 108 to release brakes of the first bogie.

In this manner, the brake control system 100 facilitates the brake application/release of the first bogie along with the second bogie in case of the failure of the first brake control unit 102. The second brake control unit 104 allows the braking of the second bogie in similar manner as explained before during normal working of the brake control system 100.

A functioning of the brake control system 100 during a failure of the second brake control unit 104 and the normal working of the first brake control unit 102 is described with reference to FIG. 2. The failure of second brake control unit 104 is detected/ascertained when an electric failure of the second application valve 158 and/or an electric failure of the second release valve 156 has occurred or the second application valve 158 and/or the second release valve 156 are not energized even after receipt of the electric actuation signals or the second application valve 158 and/or the second release valve 156 are stuck in energized state. Due to the failure of the second application valve 158 and the second release valve 156, the second application valve 158 moves to the close position and the second release valve 156 moves to the open position or the second application valve 158 moves to the close position and the second release valve 156 remains stuck in the closed position. Further, upon detection of the failure of the second application valve 158 and the second release valve 156, the redundant controller or the second controller actuates the second isolation valve 160 to move the second isolation valve 160 to the close position. Accordingly, the second brake control module 152 is isolated from the second relay valve 150 (i.e. the sixth flow pipe 176). Further, the redundant controller keeps the second emergency valve 170 to the second position.

Also, as the first brake control unit 102 continues to work normally, for brake application the first controller moves the first application valve 128 to the open position and moves the first release valve 126 to the close position, while keeping the first isolation valve 130 unactuated, thereby the controller keeps the first isolation valve 130 in the open position. Accordingly, the first brake control module 120 allows a flow the pressurized air to the sixth flow line 146 from the main reservoir 106 via the fourth flow line 142, and hence to the first relay valve 112 as the first pilot pressure.

Further, upon detection of the failure of the second brake control unit 104, the brake controllers actuate the first fail-safe valve 182 to the open position. In so doing, a flow of the pressurized air from the sixth flow line 146 to the sixth flow pipe 176 via the bypass conduit 180 is enabled. Accordingly, the third pilot pressure is applied to the second relay valve 150 to actuate the second relay valve 150 to the open position to allow the flow of pressurized air from the main reservoir 106 to the second brake cylinder pipe 110 to apply brakes of the second bogie.

For brake release, the first brake control unit 102 moves the first application valve 128 to the close position and moves the first release valve 126 to the open position, while keeping the first isolation valve 140 unactuated, thereby the controller keeps the first isolation valve 140 in the open position. Accordingly, the first brake control module 120 vents the pressurized air from the sixth flow line 146 via the fourth flow line 142, and hence from the first relay valve 112 as the first pilot pressure. Venting of the first pilot pressure from the first relay valve 112 causes the exhaust of the pressurized air from the first brake cylinder pipe 108 to release brakes of the first bogie.

Further, upon detection of the failure of the second brake control unit 104, the brake controllers actuate the first fail-safe valve 182 to the open position. In so doing, the pressurized air is vented from the sixth flow pipe 176 via the bypass conduit 180 and the fourth flow line 142. Accordingly, the third pilot pressure is vented from the second relay valve 150, causing the exhaust of pressurized air from the second brake cylinder pipe 110 to release brakes of the second bogie.

In this manner, the brake control system 100 facilitates the brake application/release of the second bogie along with the first bogie in case of the failure of the second brake control unit 104. The first brake control unit 102 allows the braking of the first bogie in a similar manner as explained before during normal working of the brake control system 100.

Referring to FIG. 5, the brake control system 100 provides flow of pressurized air to the brake control system of another rail car is shown. For providing the pressurized air to the brake control system of another rail car the first fail-safe valve 182 and the second fail-safe valve 190 is moved to the open position. Accordingly, the pressurized air is provided to the brake control system of the second rail car via the bypass conduit 180 and the flow conduit 192.

It is to be noted that the figures and the above description have shown the example embodiments in a simple and schematic manner. Many of the specific mechanical details have not been shown since the person skilled in the art should be familiar with these details and they would just unnecessarily complicate this description.

What is claimed is:

1. A brake control system having first and second brake control units that control braking of first and second bogies, respectively, of a railcar upon application of pilot pressures to relay valves by brake control modules of the first and second brake control units, the brake control system comprising:
   a bypass conduit configured to connect the brake control modules of the first and second brake control units; and
   a fail-safe valve configured to move between an open position and a closed second position,
   the fail-safe valve configured to prevent a flow of the pressurized air between the first brake control unit and the second brake control unit via the bypass conduit while the fail-safe valve is in the closed position,
   the fail-safe vale configured to allow the flow of the pressurized air between the first brake control unit and the second brake control unit via the bypass conduit while the fail-safe valve is in the open position,
   the fail-safe valve configured to provide the pilot pressure to the relay valve of the first brake control unit upon a failure of the first brake control unit and to provide the pilot pressure to the relay valve of the second brake control unit in response to a failure of the second brake control unit.

2. The brake control system of claim 1, further comprising:
   a first application valve configured to be fluidly connected to the main reservoir and to move between an open position and a closed position, the first application valve configured to move to the open position responsive to receipt of an electrical signal in response to braking of the railcar to allow flow of pressurized air from the main reservoir to the first relay valve; and
   a first isolation valve configured to be disposed downstream of the first application valve and to control a flow of the pressurized air to the first relay valve from the first application valve, the first isolation valve configured to move to a closed position upon detection of failure of the first brake control unit to prevent a flow of pressurized air between the first application valve and the first relay valve.

3. The brake control system of claim 2, further comprising:
   a first release valve configured to be fluidly connected to the first application valve and the first isolation valve, the first release valve configured to release the first pilot pressure applied to the first relay valve to release braking of the first bogie.

4. The brake control system of claim 3, wherein the first release valve is configured to move to the closed position upon detection of application of brakes of the railcar, wherein the first release valve is configured to prevent a flow of the pressurized air to a location downstream of the first release valve while the first release valve is in the closed position.

5. The brake control system of claim 1, further comprising:
   a second application valve configured to be fluidly connected to the main reservoir and configured to move between an open position and a closed position, the second application valve configured to move to the open position upon receipt of an electrical signal in response to actuation of braking of the railcar to allow flow of pressurized air from the main reservoir to the second relay valve;
   a second isolation valve configured to be disposed downstream of the second application valve and configured to control a flow of the pressurized air to the second relay valve from the second application valve, the second isolation valve configured to move to a closed position upon detection of the failure of the second brake control unit to prevent a flow of pressurized air between the second application valve and second relay valve.

6. The brake control system of claim 5, further comprising:
   a second release valve configured to be fluidly connected to the second application valve and the second isolation valve, the second release valve configured to release the third pilot pressure applied to the second relay valve to release braking of the second bogie.

7. The brake control system of claim 6, wherein the second release valve is configured to move to the closed position upon detection of application of brakes of the railcar, the second release valve preventing a flow of the pressurized air to a location downstream of the second release valve while in the closed position.

8. The brake control system of claim 1, wherein a failure of the first brake control unit is detected upon detecting a failure of at least one of the first application valve or the first release valve.

9. The brake control system of claim 1, wherein failure of the second brake control unit is detected upon detecting a failure of at least one of the second application valve or the second release valve.

10. The brake control system of claim 1, further comprising:
    a second fail-safe valve configured to fluidly connect the brake control system to another brake control system of another railcar for providing pilot pressures to another brake control system.

* * * * *